United States Patent
Kahn et al.

(10) Patent No.: US 9,848,006 B2
(45) Date of Patent: Dec. 19, 2017

(54) DETECTING PAST INTRUSIONS AND ATTACKS BASED ON HISTORICAL NETWORK TRAFFIC INFORMATION

(71) Applicant: Juniper Networks, Inc., Sunnyvale, CA (US)

(72) Inventors: Clifford E. Kahn, Westford, MA (US); Stephen R. Hanna, Brighton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/299,991

(22) Filed: Oct. 21, 2016

(65) Prior Publication Data

US 2017/0041334 A1 Feb. 9, 2017

Related U.S. Application Data

(63) Continuation of application No. 14/228,939, filed on Mar. 28, 2014, now Pat. No. 9,485,262.

(51) Int. Cl.
H04L 29/06 (2006.01)
(52) U.S. Cl.
CPC ...... H04L 63/1416 (2013.01); H04L 63/0227 (2013.01); H04L 63/1433 (2013.01)
(58) Field of Classification Search
CPC ............. H04L 63/1416; H04L 63/0227; H04L 63/1433

See application file for complete search history.

(56) References Cited

U.S. PATENT DOCUMENTS

| 7,574,740 | B1 | 8/2009 | Kennis |
| 7,913,303 | B1 | 3/2011 | Rouland |
| 8,266,703 | B1 | 9/2012 | Magdych |
| 8,601,564 | B2 * | 12/2013 | Wahl .................. H04L 63/1416 726/11 |
| 8,621,618 | B1 * | 12/2013 | Ramsey ............. H04L 63/1408 370/392 |

(Continued)

OTHER PUBLICATIONS

Wikipedia, "Configuration management database", https://en.wikipedia.org/wiki/Configuration_management_database, Mar. 3, 2014, 3 pages.

(Continued)

Primary Examiner — Matthew Smithers
(74) Attorney, Agent, or Firm — Harrity & Harrity, LLP

(57) ABSTRACT

A device may receive information that identifies an attack signature for detecting an intrusion. The device may determine a device configuration that is vulnerable to the intrusion, may determine an endpoint device associated with the device configuration, and may determine a time period during which the endpoint device was associated with the device configuration. The device may determine an endpoint identifier associated with the endpoint device during the time period, and may identify network traffic information associated with the endpoint identifier during the time period. The device may apply the attack signature to the network traffic information, and may determine whether the endpoint device was subjected to the intrusion during the time period based on applying the attack signature to the network traffic information. The device may selectively perform an action based on determining whether the endpoint device was subjected to the intrusion.

20 Claims, 12 Drawing Sheets

(56) References Cited

U.S. PATENT DOCUMENTS

| | | | |
|---|---|---|---|
| 8,782,790 B1* | 7/2014 | Smith | H04L 63/1441 726/24 |
| 9,485,262 B1* | 11/2016 | Kahn | H04L 63/1416 |
| 2002/0032717 A1 | 3/2002 | Malan | |
| 2002/0166063 A1* | 11/2002 | Lachman, III | H04L 63/0263 726/23 |
| 2002/0178383 A1 | 11/2002 | Hrabik | |
| 2003/0004688 A1* | 1/2003 | Gupta | H04L 63/1441 702/188 |
| 2003/0145225 A1 | 7/2003 | Bruton | |
| 2003/0145226 A1* | 7/2003 | Bruton, III | H04L 63/1408 726/22 |
| 2003/0236990 A1* | 12/2003 | Hrastar | H04L 63/1416 726/11 |
| 2004/0015719 A1* | 1/2004 | Lee | H04L 63/1416 726/23 |
| 2004/0073800 A1 | 4/2004 | Shah | |
| 2004/0098623 A1* | 5/2004 | Scheidell | G06F 21/552 726/23 |
| 2004/0111531 A1 | 6/2004 | Staniford | |
| 2004/0143749 A1* | 7/2004 | Tajalli | G06F 21/566 726/23 |
| 2005/0005169 A1 | 1/2005 | Kelekar | |
| 2005/0050353 A1* | 3/2005 | Thiele | G06F 21/554 726/4 |
| 2005/0188215 A1* | 8/2005 | Shulman | H04L 63/1416 713/188 |
| 2005/0216770 A1* | 9/2005 | Rowett | H04L 63/1416 726/5 |
| 2006/0018466 A1* | 1/2006 | Adelstein | H04L 63/1491 380/46 |
| 2006/0191010 A1 | 8/2006 | Benjamin | |
| 2006/0242701 A1* | 10/2006 | Black | H04L 63/1491 726/22 |
| 2008/0016208 A1 | 1/2008 | Treinen | |
| 2008/0141332 A1* | 6/2008 | Treinen | H04L 63/1416 726/1 |
| 2011/0302656 A1 | 12/2011 | El-Moussa | |
| 2012/0210427 A1 | 8/2012 | Bronner | |
| 2015/0033340 A1* | 1/2015 | Giokas | H04L 63/1433 726/23 |

OTHER PUBLICATIONS

Wikipedia, "Intrusion detection system", https://en.wikipedia.org/wiki/Intrusion_detection_system, Mar. 8, 2014, 6 pages.

* cited by examiner

DETECTING PAST INTRUSIONS AND ATTACKS BASED ON HISTORICAL NETWORK TRAFFIC INFORMATION

RELATED APPLICATION

This appllication is a continuation of U.S. patent application Ser. No. 14/228,939, filed Mar. 28, 2014 (now U.S. Pat. No. 9,485,262), which is incorporated herein by reference.

BACKGROUND

An intrusion detection system may include a device or a software application that monitors a network or a system for malicious activities or policy violations, and that produces reports relating to those activities or violations. For example, an intrusion detection system may identify possible intrusions (and/or intrusion attempts), may log information about the possible intrusions, and may report the possible intrusions. Some intrusion detection systems may attempt to stop intrusion attempts.

SUMMARY

According to some possible implementations, a device may receive information that identifies an attack signature for detecting an intrusion. The device may determine a device configuration that is vulnerable to the intrusion, may determine an endpoint device associated with the device configuration, and may determine a time period during which the endpoint device was associated with the device configuration. The device may determine an endpoint identifier associated with the endpoint device during the time period, and may identify network traffic information associated with the endpoint identifier during the time period. The device may apply the attack signature to the network traffic information, and may determine whether the endpoint device was subjected to the intrusion during the time period based on applying the attack signature to the network traffic information. The device may selectively perform an action based on determining whether the endpoint device was subjected to the intrusion.

According to some possible implementations, a computer-readable medium may store instructions that, when executed by a processor, cause the processor to receive information that identifies a set of conditions for detecting an intrusion, to determine a device configuration that is vulnerable to the intrusion, to determine an endpoint device associated with the device configuration, and to determine a time period during which the endpoint device was associated with the device configuration. The time period may have occurred before the information, that identifies the set of conditions, was received. The instructions may cause the processor to determine an endpoint identifier associated with the endpoint device during the time period, to identify network traffic information associated with the endpoint identifier during the time period, to compare the network traffic information to the set of conditions, and to determine that the endpoint device was subjected to the intrusion based on comparing the network traffic information to the set of conditions. The instructions may cause the processor to perform an action based on determining that the endpoint device was subjected to the intrusion.

According to some possible implementations, a method may include receiving, by an intrusion detection device, information that identifies an attack signature for detecting an intrusion; determining, by the intrusion detection device, a device configuration that is vulnerable to the intrusion; and identifying, by the intrusion detection device, an endpoint device associated with the device configuration. The method may include determining, by the intrusion detection device, an endpoint identifier associated with the endpoint device; and identifying, by the intrusion detection device, network traffic information, stored prior to receiving the information that identifies the attack signature, associated with the endpoint identifier. The method may include applying, by the intrusion detection device, the attack signature to the network traffic information; determining, by the intrusion detection device, that the endpoint device was subjected to the intrusion based on applying the attack signature to the network traffic information; and performing, by the intrusion detection device, an action based on determining that the endpoint device was subjected to the intrusion. The action may include providing a notification that the endpoint device was subjected to the intrusion or causing network traffic, associated with the intrusion, to be blocked.

DETAILED DESCRIPTION

The following detailed description of example implementations refers to the accompanying drawings. The same reference numbers in different drawings may identify the same or similar elements.

An intrusion detection system may monitor a network or a system for malicious activity, and may provide notifications relating to the malicious activity. The intrusion detection system may receive an attack signature, and may compare characteristics of network traffic to the attack signature to detect the malicious activity. However, attack signatures are typically generated after a new type of attack is discovered. Thus, an intrusion detection system may not be capable of detecting past intrusions that occurred prior to the attack signature being generated, such as zero-day attacks. Implementations described herein assist an intrusion detection system in detecting past intrusions and providing a notification of past intrusions. In this way, a system administrator or a network device may be alerted to a past intrusion that took place before an attack signature, used to detect the intrusion, was generated.

Figure 1:
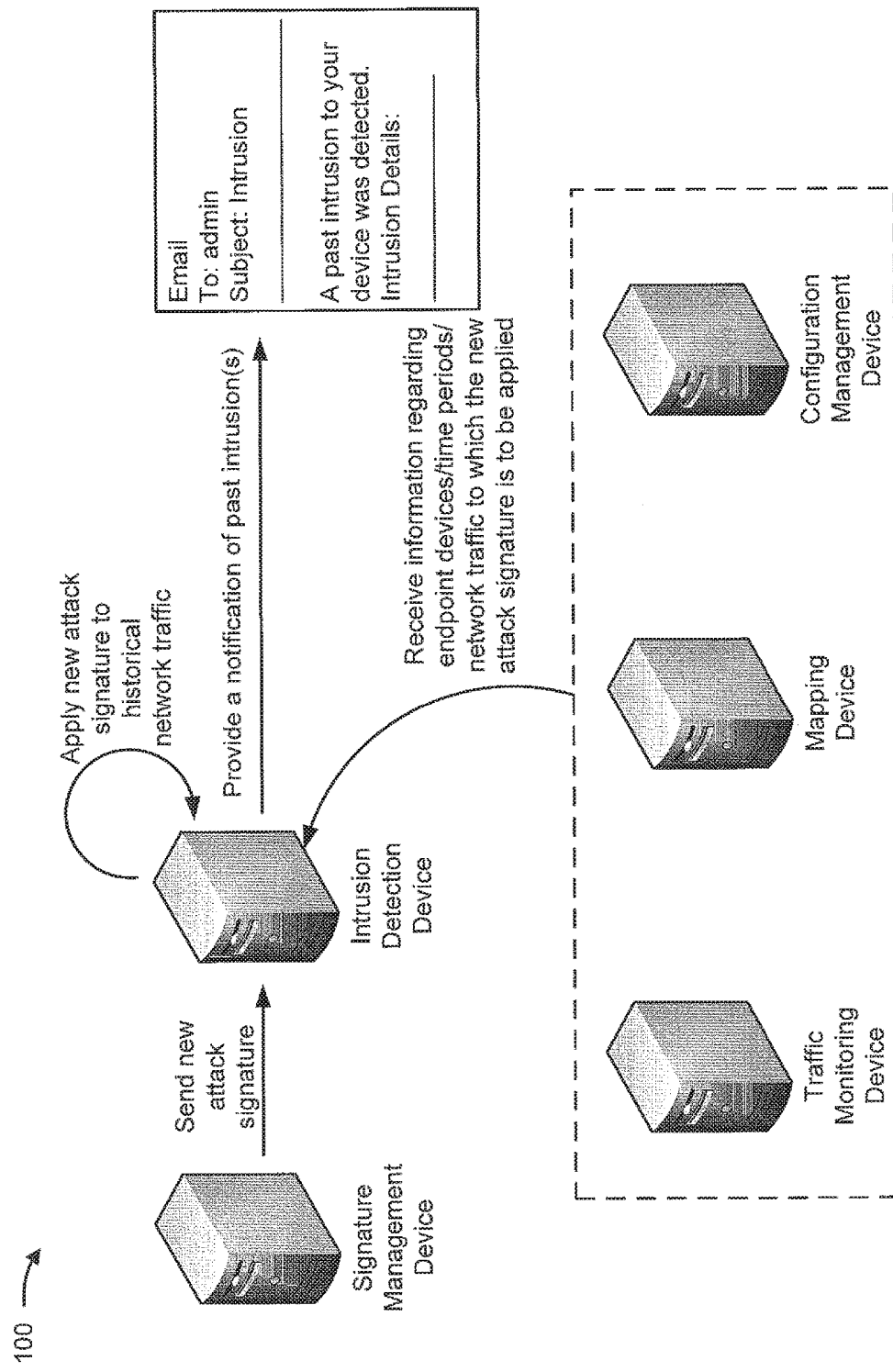
FIG. 1 is a diagram of an overview of an example implementation described herein.

FIG. 1 is a diagram of an overview of an example implementation 100 described herein. As shown in FIG. 1, a signature management device may provide a new attack signature to an intrusion detection device. The new attack signature may be generated to detect a new type of intrusion (e.g., after the new type of intrusion has already taken place). As further shown, the intrusion detection device may receive, from various devices associated with an intrusion detection system (e.g., a traffic monitoring device, a mapping device, a configuration management device, etc.), information associated with endpoint devices, time periods, and network traffic to which the new attack signature is to be applied.

As an example, a traffic monitoring device may monitor and store historical network traffic so that the attack signature may be applied to the historical network traffic to detect past intrusions. A mapping device may map temporary endpoint identifiers, associated with endpoint devices, to persistent endpoint identifiers, associated with endpoint devices, so that detected intrusions may be associated with endpoint devices. A configuration management device may store device configurations associated with endpoint devices so that the attack signatures may be applied to historical network traffic associated with endpoint devices with device configurations that are vulnerable to intrusion.

As further shown in FIG. 1, the intrusion detection device may use the received information to apply the attack signatures to historical network traffic associated with vulnerable endpoint devices. Upon detecting a past intrusion, the intrusion detection device may provide a notification of the past intrusion, such as by sending an email to a system administrator, logging the past intrusion, etc. In this way, the system administrator may be alerted to a past intrusion that took place before an attack signature, used to detect the intrusion, was generated. Furthermore, the system administrator, the intrusion detection device, or another device may take a corrective action to counteract the intrusion.

Figure 2:
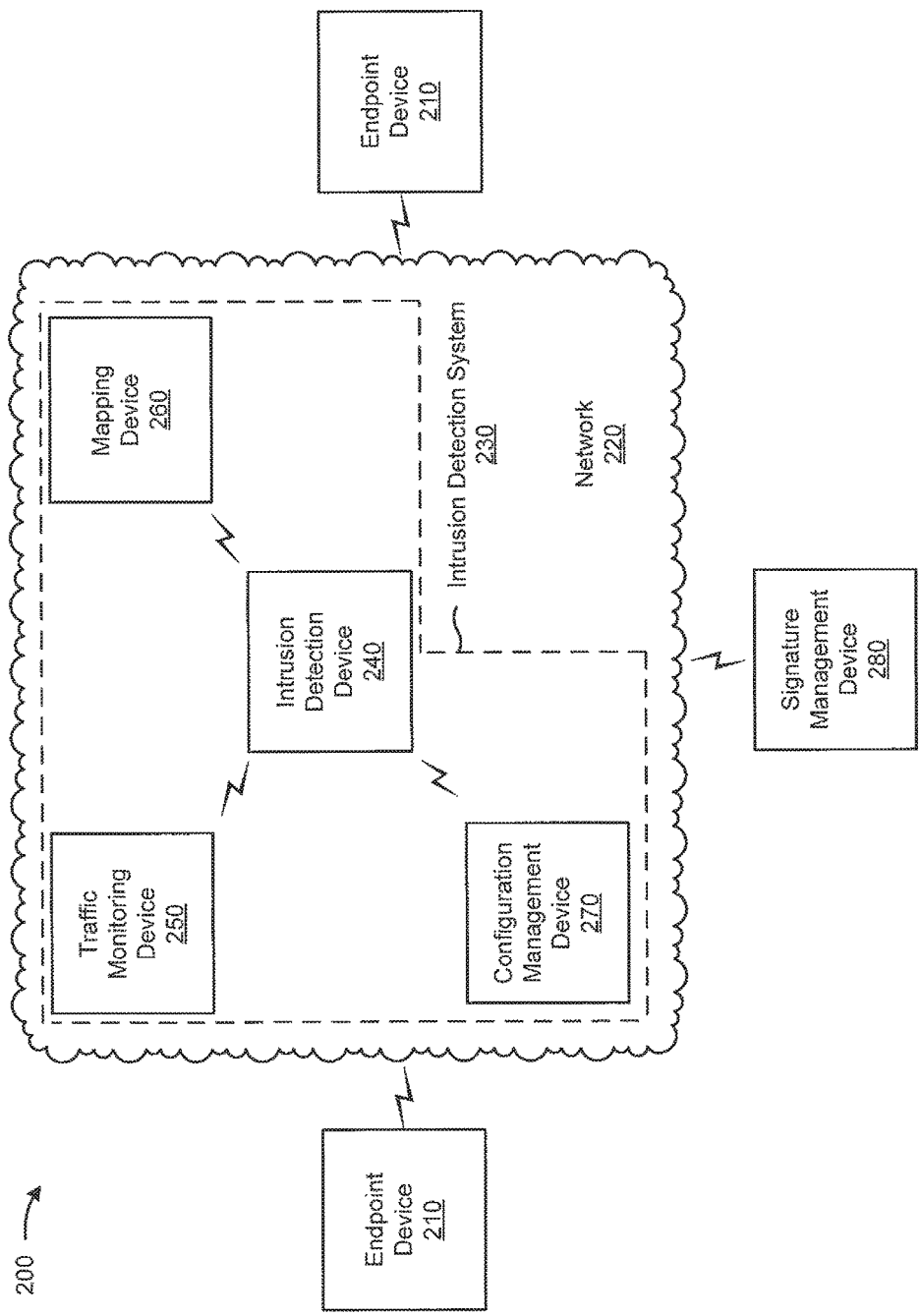
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more endpoint devices 210 (hereinafter referred to collectively as "endpoint devices 210," and individually as "endpoint device 210"), a network 220, and an intrusion detection system 230, which may include an intrusion detection device 240, a traffic monitoring device 250, a mapping device 260, and a configuration management device 270. As further shown, environment 200 may include a signature management device 280. Devices of environment 200 may interconnect via wired connections, wireless connections, or a combination of wired and wireless connections.

Endpoint device 210 may include one or more devices capable of receiving and/or providing information over a network (e.g., network 220), and/or capable of generating, storing, and/or processing information received and/or provided over the network. For example, endpoint device 210 may include a computing device, such as a laptop computer, a tablet computer, a handheld computer, a desktop computer, a mobile phone (e.g., a smart phone, a radiotelephone, etc.), a personal digital assistant, a network device (e.g., a router, a gateway, a firewall, a hub, a bridge, etc.), or a similar device. Endpoint device 210 may act as an endpoint (e.g., a source and/or a destination) for a communication with another endpoint device 210. For example, a first endpoint device 210 may provide information to a second endpoint device 210 (e.g., via network 220 and/or intrusion detection system 230).

Network 220 may include one or more wired and/or wireless networks. For example, network 220 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), a private network, a virtual network, an ad hoc network, an intranet, the Internet, a fiber optic-based network, a cloud computing network, or a combination of these or other types of networks.

Intrusion detection system 230 may include one or more devices capable of processing and/or transferring traffic between endpoint devices 210 and/or capable of detecting intrusions associated with the traffic and/or endpoint devices 210. For example, intrusion detection system 230 may include intrusion detection device 240, traffic monitoring device 250, mapping device 260, and/or configuration management device 270.

Intrusion detection device 240 may include one or more intrusion detection devices, such as a reverse proxy, a server (e.g., a proxy server), a traffic transfer device, a gateway, a hub, a switch, a load balancer, a security device, or the like. Intrusion detection device 240 may protect endpoint devices 210 by detecting intrusions (e.g., malicious attacks), such as by applying attack signatures to network traffic, associated with endpoint devices 210, to detect the intrusions.

Intrusion detection device 240 may be used in connection with a single endpoint device 210 or a group of endpoint devices 210 (e.g., a data center, a private network, etc.). Communications may be routed through intrusion detection device 240 to reach the one or more endpoint devices 210. For example, intrusion detection device 240 may be positioned within a network as a gateway to a private network that includes one or more endpoint devices 210. Additionally, or alternatively, communications from endpoint device 210 may be encoded such that the communications are routed to intrusion detection device 240 before being routed to another endpoint device 210.

Traffic monitoring device 250 may include one or more devices configured to monitor and/or store network traffic communicated between endpoint devices 210. For example, traffic monitoring device 250 may include a network tap, a packet sniffer, a packet analyzer, a server, a gateway, a firewall, a switch, a hub, a router, a bridge, or the like. Traffic monitoring device 250 may store historical (e.g., past) network traffic information for intrusion detection, such as network addresses (e.g., a source network address and/or a destination network address) associated with communications, time periods associated with communications, payloads and/or contents associated with communications, etc.

Mapping device 260 may include one or more devices configured to monitor and/or store mapping information. For example, mapping device 260 may include a server, a storage device, or the like. The mapping information may identify associations between temporary endpoint identifiers (e.g., network addresses) and persistent endpoint identifiers. Additionally, or alternatively, the mapping information may identify time periods during which the temporary endpoint identifiers are associated with the persistent endpoint identifiers. In this way, intrusion detection system 230 may associate network traffic with a particular endpoint device 210.

Configuration management device 270 may include one or more devices configured to monitor and/or store configuration information. For example, configuration management device 270 may include a server, a storage device, a configuration management database, or the like. The configuration information may identify associations between endpoint devices 210 (e.g., identified by endpoint identifiers) and device configurations of endpoint devices 210 (e.g., software configurations, firmware configurations, hardware configurations, etc.). Additionally, or alternatively, the configuration information may identify time periods during which endpoint devices 210 are associated with the device configurations. In this way, intrusion detection system 230 may apply attack signatures to endpoint devices 210 with vulnerable device configurations.

Signature management device 280 may include one or more devices configured to provide attack signatures to intrusion detection system 230. For example, signature management device 280 may include a server, a storage device, or the like. Signature management device 280 may receive input that identifies a new attack signature used to detect a new type of intrusion (e.g., after the new type of intrusion has already taken place). Signature management device 280 may provide information that identifies the new attack signature to intrusion detection system 230 (e.g., intrusion detection device 240) so that the new attack signature may be applied to historical network traffic to detect past intrusions.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, one or more of the devices of environment 200 may be implemented within endpoint device 210. Additionally, or alternatively, a set of devices (e.g., one or more devices) of environment 200 may perform one or more functions described as being performed by another set of devices of environment 200.

Figure 3:
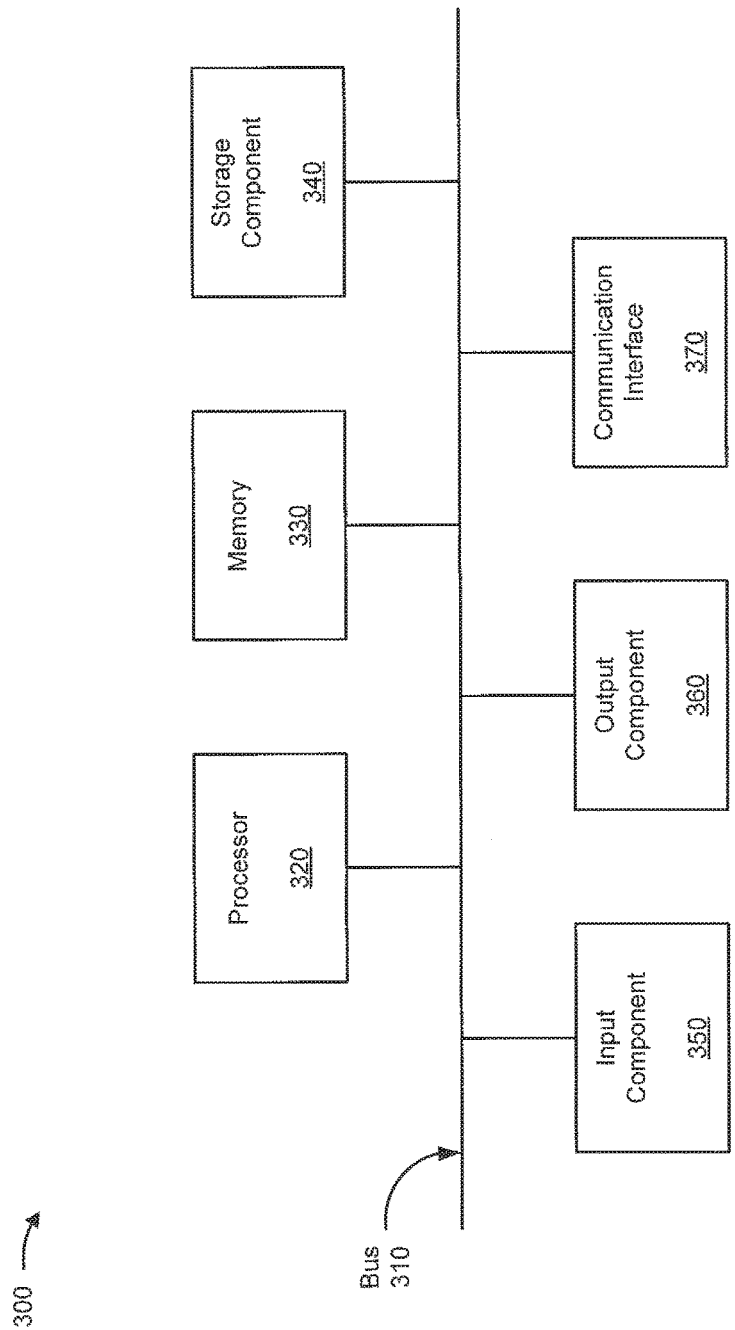
FIG. 3 is a diagram of example components of one or more devices of FIG. 2.

FIG. 3 is a diagram of example components of a device 300. Device 300 may correspond to endpoint device 210, intrusion detection system 230, intrusion detection device 240, traffic monitoring device 250, mapping device 260, configuration management device 270, and/or signature management device 280. In some implementations, endpoint device 210, intrusion detection system 230, intrusion detection device 240, traffic monitoring device 250, mapping device 260, configuration management device 270, and/or signature management device 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
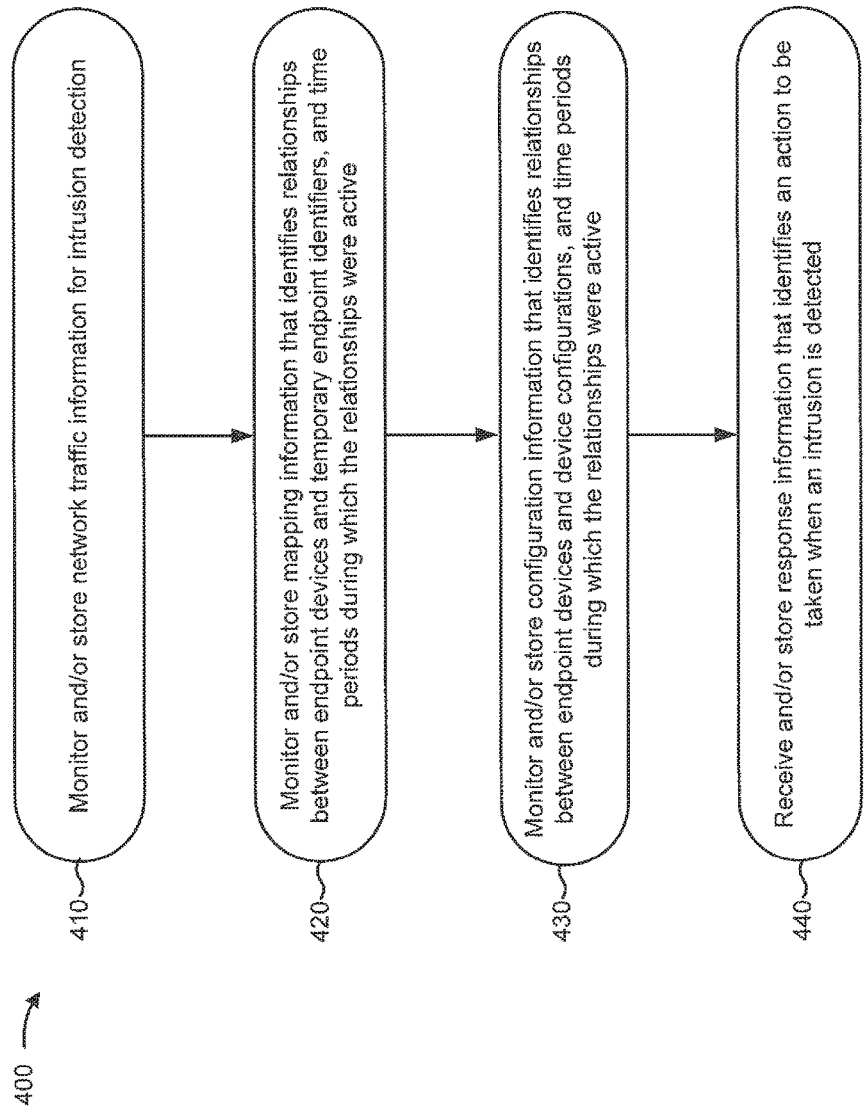
FIG. 4 is a flow chart of an example process for monitoring and storing information to be used to detect past intrusions.

FIG. 4 is a flow chart of an example process 400 for monitoring and storing information to be used to detect past intrusions. In some implementations, one or more process blocks of FIG. 4 may be performed by one or more devices of intrusion detection system 230. For example, one or more process blocks of FIG. 4 may be performed by intrusion detection device 240. In some implementations, one or more process blocks of FIG. 4 may be performed by another device or a group of devices separate from or including intrusion detection device 240, such as endpoint device 210, traffic monitoring device 250, mapping device 260, configuration management device 270, and/or signature management device 280.

As shown in FIG. 4, process 400 may include monitoring and/or storing network traffic information for intrusion detection (block 410). For example, intrusion detection system 230 (e.g., traffic monitoring device 250) may monitor and/or store network traffic information. The network traffic information may include a temporary endpoint identifier, such as a network address (e.g., an internet protocol (IP) address), that identifies an endpoint device 210 associated with a communication. For example, the network traffic information may include a source endpoint identifier (e.g., a source IP address, a source port, etc.) and a destination endpoint identifier (e.g., a destination IP address, a destination port, etc.) for a particular communication.

Additionally, or alternatively, the network traffic information may identify a time period associated with a communication (e.g., a date and/or a time at which the communication was transmitted by a device of environment 200, a date and/or a time at which the communication was received by a device of environment 200, a date and/or a time at which the communication was processed by a device of environment 200, etc.), may identify a protocol associated with a communication (e.g., a hypertext transfer protocol (HTTP), a file transfer protocol (FTP), a transmission control protocol (TCP), a uniform datagram protocol (UDP), etc.), may identify content included in the communication (e.g., content included in a packet, such as raw packet data, content included in a packet field, etc.), or the like.

In some implementations, traffic monitoring device 250 may store a subset of monitored network traffic. For example, traffic monitoring device 250 may store network traffic information associated with a particular endpoint device 210 (e.g., an endpoint device 210 identified as important, an endpoint device 210 identified as storing sensitive information, an endpoint device 210 identified as vulnerable, an endpoint device 210 identified as suspicious, etc.), associated with a particular protocol (e.g., FTP traffic), associated with a particular time period, associated with particular packet contents (e.g., communications associated with a particular website, a particular quality of service class, etc.), etc. In this way, traffic monitoring device 250 may use fewer resources (e.g., storage space) than if all network traffic were stored. Additionally, or alternatively, traffic monitoring device 250 may discard stored network traffic (e.g., after a threshold amount of time has passed, based on a random retention policy, etc.).

Traffic monitoring device 250 may store the network traffic information (e.g., in a data structure) so that the network traffic information may later be analyzed to detect an intrusion. For example, intrusion detection device 240 may apply a new attack signature to historical network traffic information, stored by traffic monitoring device 250, to detect past intrusions.

As further shown in FIG. 4, process 400 may include monitoring and/or storing mapping information that identifies relationships between endpoint devices and temporary endpoint identifiers, and time periods during which the relationships were active (block 420). For example, intrusion detection system 230 (e.g., mapping device 260) may monitor and/or store mapping information. The mapping information may identify relationships between temporary endpoint identifiers and persistent endpoint identifiers. Additionally, or alternatively, the mapping information may identify a time period during which the relationships were active (e.g., during which a particular temporary endpoint identifier was associated with a particular persistent endpoint identifier).

As an example, endpoint device 210 may be assigned a temporary endpoint identifier, such as an IP address, for a particular communication session. Endpoint device 210 may also be identified by a persistent endpoint identifier, such as a unique identifier, a media access control (MAC) address, a unified access control (UAC) identifier, a device signature, a device certificate, a device profile (e.g., a set of characteristics associated with endpoint device 210, such as a set of cookies installed on a web browser of endpoint device 210), a mobile telephone number, an international mobile subscriber identity (IMSI), etc. The mapping information may identify associations between temporary endpoint identifiers and persistent endpoint identifiers, and may identify a time period (e.g., a date and/or a time) during which a temporary endpoint identifier was associated with a persistent endpoint identifier. In this way, network traffic, associated with a particular temporary endpoint identifier at a particular time, may be mapped to a particular endpoint device 210 (e.g., an endpoint device 210 identified by a persistent endpoint identifier that was associated with the particular temporary endpoint identifier at the particular time).

As further shown in FIG. 4, process 400 may include monitoring and/or storing configuration information that identifies relationships between endpoint devices and device configurations, and time periods during which the relationships were active (block 430). For example, intrusion detection system 230 (e.g., configuration management device 270) may monitor and/or store configuration information. The configuration information may identify relationships between endpoint devices 210 (e.g., identified by an endpoint identifier, such as a persistent endpoint identifier and/or a temporary endpoint identifier) and device configurations of endpoint devices 210. Additionally, or alternatively, the configuration information may identify a time period during which the relationships were active (e.g., during which a particular endpoint device 210 had a particular device configuration).

A device configuration may refer to a software configuration of endpoint device 210 (e.g., software installed on and/or executing on endpoint device 210, a version of the software, a combination of software installed on and/or executing on endpoint device 210, etc.), a firmware configuration of endpoint device 210 (e.g., a firmware version installed on and/or executing on endpoint device 210, etc.), a hardware configuration of endpoint device 210 (e.g., a hardware component included in endpoint device 210, etc.), a software identifier (SWID) that identifies a set of software installed on endpoint device 210, a set of parameters stored on the endpoint device (e.g., a set of ports configured to be open via firewall software, a registry configuration, etc.), or the like. In some implementations, the device configuration may identify an operating system executing on endpoint device 210, a device driver installed on endpoint device 210, a patch installed on endpoint device 210, a library (e.g., a shared library) installed on endpoint device 210, a set of software applications (e.g., programs) installed on and/or executing on endpoint device 210, or the like.

The configuration information may identify associations between endpoint devices 210 and device configurations, and may identify a time period (e.g., a date and/or a time) during which endpoint device 210 was associated with a particular device configuration. In this way, intrusion detection device 240 may apply attack signatures to network traffic associated with endpoint devices 210 with a vulnerable device configuration during a particular time period (e.g., a device configuration vulnerable to a particular type of intrusion).

Additionally, or alternatively, configuration management device 270 may store configuration information that maps endpoint devices 210 (e.g., using a persistent endpoint identifier) to a user, a group of users, a classification (e.g., a company, a department, etc.). In this way, intrusion detection device 240 may be configured to apply attack signatures to particular endpoint devices 210 that are identified as being associated with a particular user, classification, etc.

As further shown in FIG. 4, process 400 may include receiving and/or storing response information that identifies an action to be taken when an intrusion is detected (block 440). For example, intrusion detection system 230 (e.g., intrusion detection device 240) may receive and/or store response information. In some implementations, the response information may be provided to intrusion detection device 240 based on input provided by a user, such as a system administrator.

The response information may identify an action to be taken (e.g., by intrusion detection device 240) when intrusion detection device 240 detects an intrusion. For example, the action may include sending a message about the detected intrusion to a system administrator (e.g., via an email message, a text message, etc.); providing a notification of the detected intrusion to another device (e.g., to a syslog server); logging information associated with the detected intrusion; blocking, restricting, analyzing, and/or diverting, network traffic to and/or from endpoint device 210 associated with the intrusion; sending an instruction (e.g., to another device) to block, restrict, analyze, and/or divert network traffic to and/or from endpoint device 210 associated with the intrusion; or the like. In this way, when intrusion detection system 230 detects an intrusion, an action may be taken to notify a system administrator about the intrusion and/or to counteract the intrusion.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of monitoring and storing information to be used to detect past intrusions.

Figure 5A:
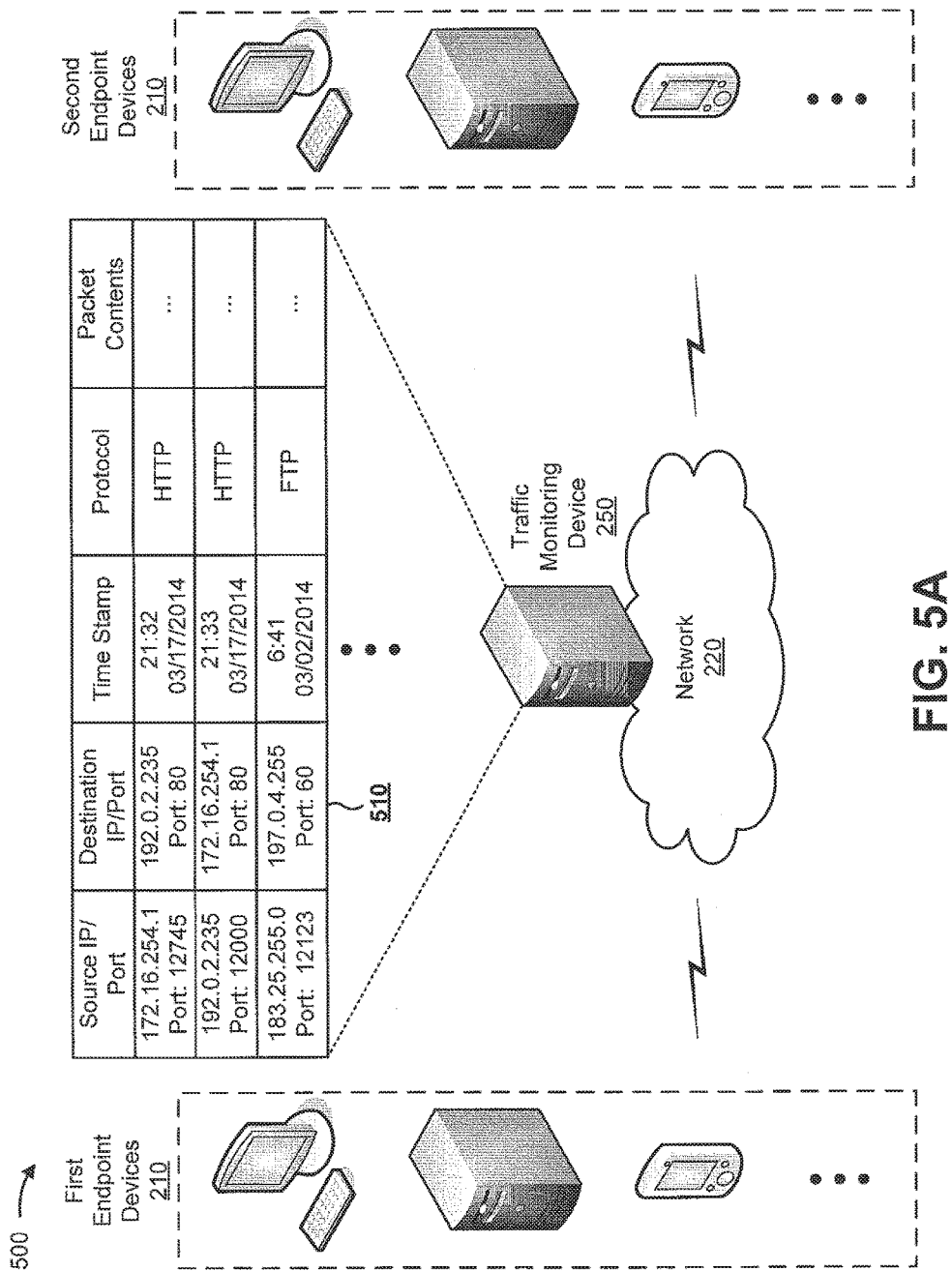
FIGS. 5A-5D are diagrams of an example implementation relating to the example process shown in FIG. 4.

As shown in FIG. 5A, traffic monitoring device 250 may monitor network traffic between first endpoint devices 210 and second endpoint devices 210, and may store network traffic information in a data structure 510. As shown, assume that traffic monitoring device 250 stores network traffic information associated with packets communicated between first endpoint devices 210 and second endpoint devices 210, such as a source IP address identified in a packet, a source port identified in the packet, a destination IP address identified in the packet, a destination port identified in the packet, a time stamp identified in the packet (and/or determined by traffic monitoring device 250), a protocol identified in the packet, and other contents included in the packet.

As shown in the first row of data structure 510, assume that traffic monitoring device 250 receives and records network traffic information associated with a packet that identifies a source IP address of 172.16.254.1, a source port of 12745 a destination IP address of 192.0.2.235, a destination port of 80, a time stamp of 21:32 on Mar. 17, 2014, a protocol of HTTP, and various packet contents. This network traffic information is provided as an example. In some implementations, traffic monitoring device 250 may store additional network traffic information, less network traffic information, and/or different network traffic information. As shown, traffic monitoring device 250 may store network traffic information associated with multiple communications (e.g., packets). Traffic monitoring device 250 may store the network traffic information for later intrusion detection using new attack signatures.

Figure 5B:
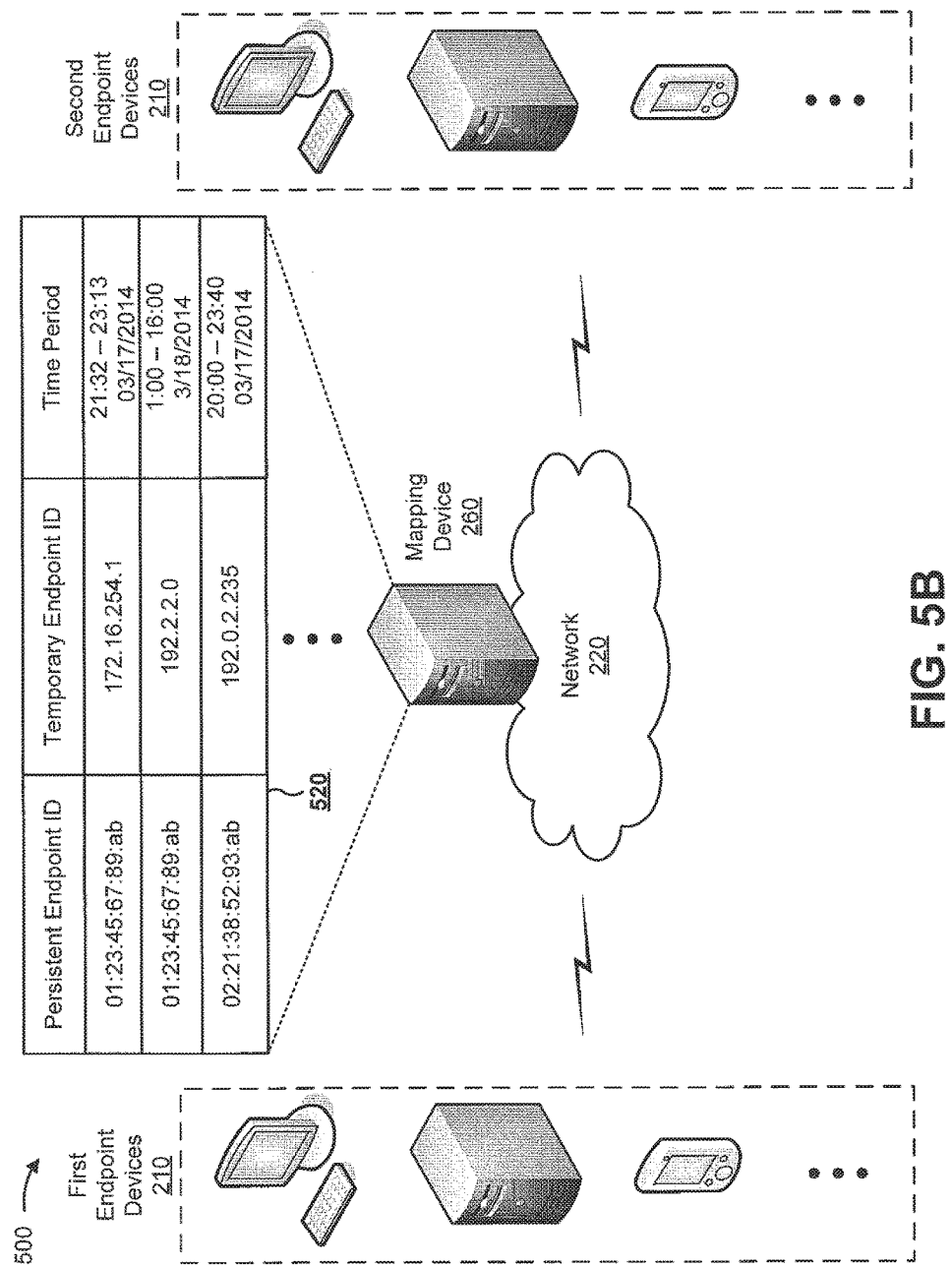

As shown in FIG. 5B, mapping device 260 may monitor mapping information associated with first endpoint devices 210 and/or second endpoint devices 210, and may store the mapping information in a data structure 520. As shown, assume that mapping device 260 stores mapping information that identifies a persistent endpoint identifier of endpoint device 210 (e.g., a MAC address), a temporary endpoint identifier of endpoint device 210 (e.g., an IP address), and a time period during which the temporary endpoint identifier was assigned to endpoint device 210 having the persistent endpoint identifier.

As shown in the first row of data structure 520, assume that mapping device 260 determines that an endpoint device 210 identified by a MAC address of 01:23:45:67:89:ab was assigned an IP address of 172.16.254.1 during a time period from 21:32 through 23:13 on Mar. 17, 2014. As shown in the second row of data structure 520, assume that mapping device 260 determines that at a later time, the same endpoint device 210, identified by the MAC address of 01:23:45:67:89:ab, was assigned an IP address of 192.2.2.0 during a time period from 1:00 through 16:00 on Mar. 18, 2014. This mapping information is provided as an example. In some implementations, mapping device 260 may store additional mapping information, less mapping information, and/or different mapping information. As shown, mapping device 260 may store mapping information associated with multiple endpoint devices 210. Mapping device 260 may store the mapping information so that network traffic information, associated with a particular temporary endpoint identifier, may be mapped to endpoint device 210 identified by a persistent endpoint identifier, or vice versa.

Figure 5C:
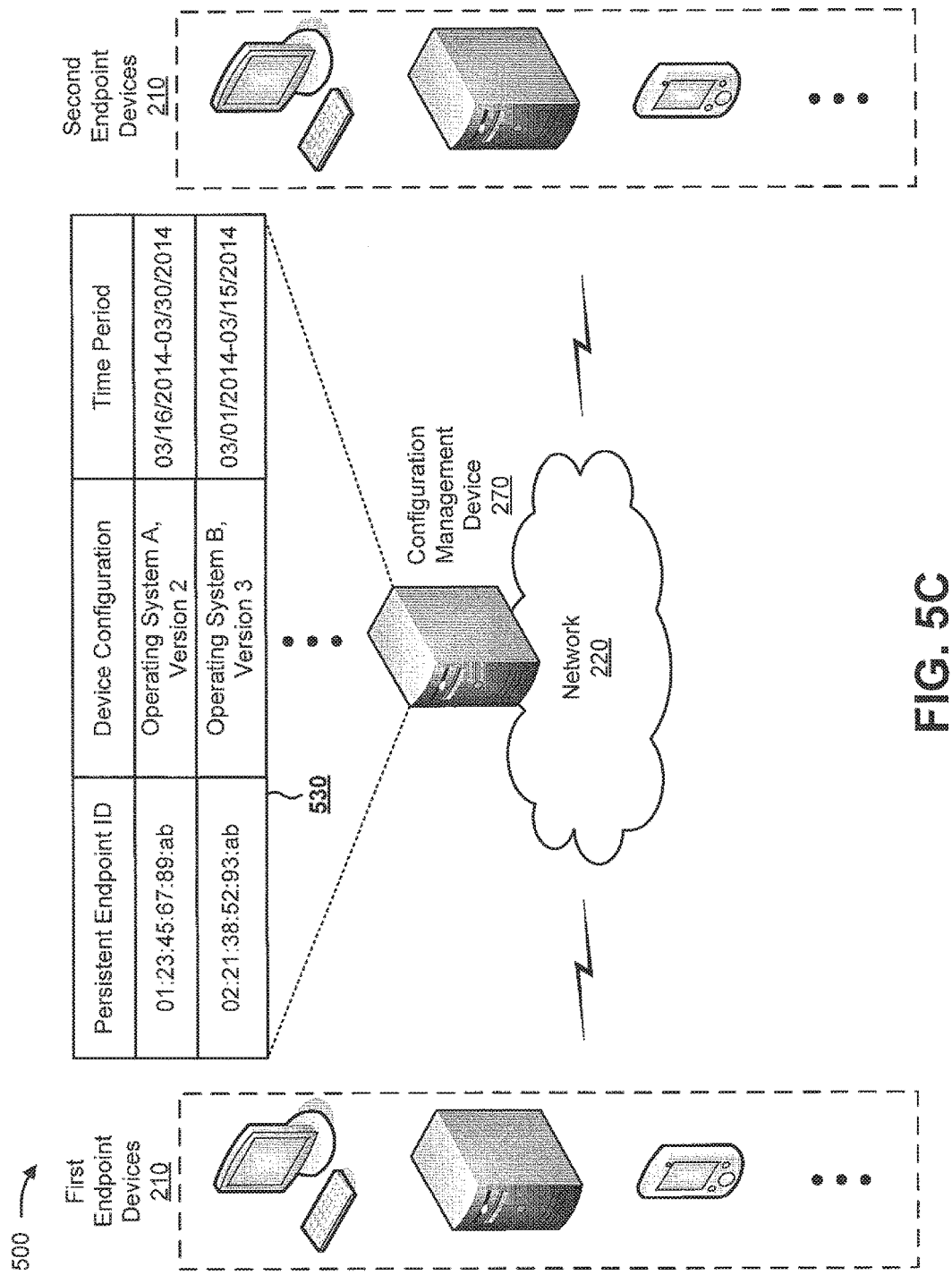

As shown in FIG. 5C, configuration management device 270 may monitor configuration information associated with first endpoint devices 210 and/or second endpoint devices 210, and may store the configuration information in a data structure 530. As shown, assume that configuration management device 270 stores configuration information that identifies a persistent endpoint identifier of endpoint device 210 (e.g., a MAC address), a device configuration of endpoint device 210 (e.g., an operating system installed and/or executing on endpoint device 210), and a time period during which endpoint device 210, identified by the persistent endpoint identifier, had the device configuration.

As shown in the first row of data structure 530, assume that configuration management device 270 determines that an endpoint device 210 identified by a MAC address of 01:23:45:67:89:ab had installed and was executing Version 2 of Operating System A during a time period from Mar. 16, 2014 through Mar. 30, 2014. This configuration information is provided as an example. In some implementations, configuration management device 270 may store additional configuration information, less configuration information, and/or different configuration information. As shown, configuration management device 270 may store configuration information associated with multiple endpoint devices 210. Configuration management device 270 may store the configuration information so that attack signatures can be applied to network traffic associated with endpoint devices 210, identified by a persistent endpoint identifier, that had a device configuration vulnerable to an intrusion.

Figure 5D:
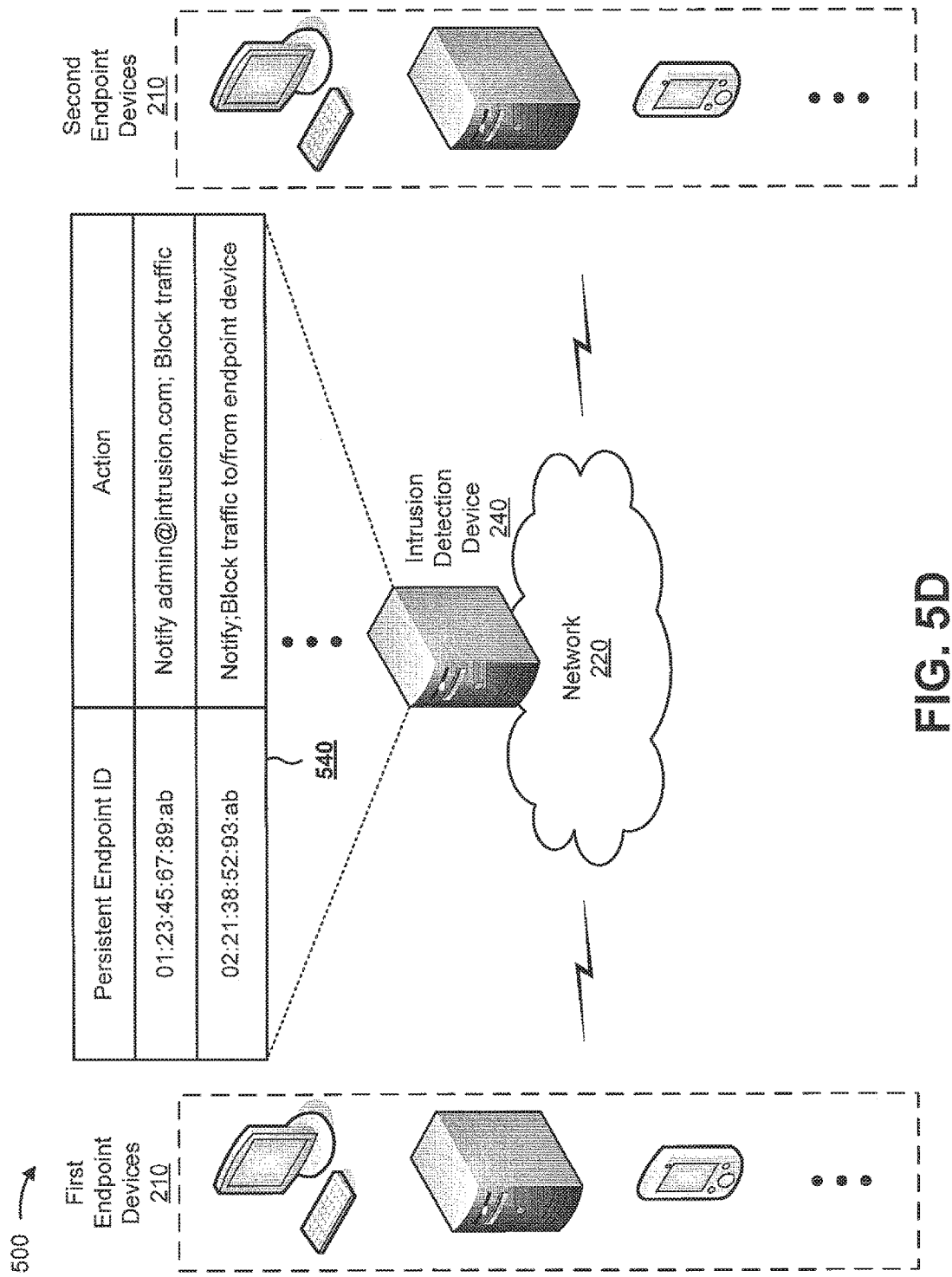

As shown in FIG. 5D, intrusion detection device 240 may receive response information associated with first endpoint devices 210 and/or second endpoint devices 210, and may store the response information in a data structure 540. As shown, assume that intrusion detection device 240 stores response information that identifies a persistent endpoint identifier of endpoint device 210 (e.g., a MAC address), and an action to be taken when an intrusion, associated with endpoint device 210, is detected.

As shown in the first row of data structure 540, assume that intrusion detection device 240 receives information indicating that when an intrusion is detected for an endpoint device 210 identified by a MAC address of 01:23:45:67:89:ab, that intrusion detection device 240 is to notify an administrator using an email address of admin@intrusion.com, and is further to block traffic to and from endpoint device 210. This response information is provided as an example. In some implementations, intrusion detection device 240 may store additional response information, less response information, and/or different response information. As shown, intrusion detection device 240 may store response information associated with multiple endpoint devices 210. Intrusion detection device 240 may store the response information so that an action can be taken to counteract a detected intrusion.

As indicated above, FIGS. 5A-5D are provided merely as an example. Other examples are possible and may differ from what was described with regard to FIGS. 5A-5D.

Figure 6:
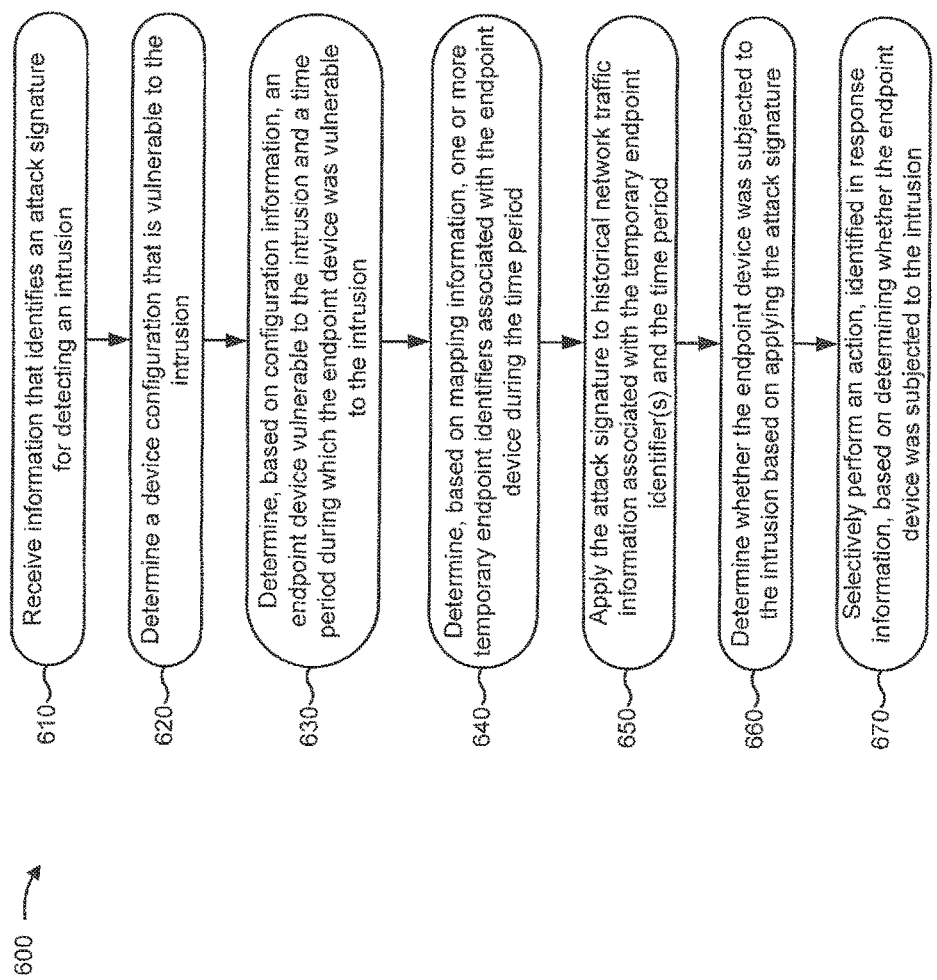
FIG. 6 is a flow chart of an example process for detecting past intrusions based on historical network traffic information.

FIG. 6 is a flow chart of an example process 600 for detecting past intrusions based on historical network traffic information. In some implementations, one or more process blocks of FIG. 6 may be performed by one or more devices of intrusion detection system 230. For example, one or more process blocks of FIG. 6 may be performed by intrusion detection device 240. In some implementations, one or more process blocks of FIG. 6 may be performed by another device or a group of devices separate from or including intrusion detection device 240, such as endpoint device 210, traffic monitoring device 250, mapping device 260, configuration management device 270, and/or signature management device 280.

As shown in FIG. 6, process 600 may include receiving information that identifies an attack signature for detecting an intrusion (block 610), and determining a device configuration that is vulnerable to the intrusion (block 620). For example, intrusion detection system 230 (e.g., intrusion detection device 240) may receive information that identifies an attack signature for detecting an intrusion. In some implementations, signature management device 280 may provide an attack signature to intrusion detection device 240. For example, signature management device 280 may be associated with a software vendor, and may periodically provide attack signatures that may be used to identify intrusions to which a software program, associated with the software vendor, is susceptible.

An attack signature may refer to, for example, an arrangement of information that can be used to identify an attacker's attempt to exploit endpoint device 210, a file that includes a data sequence used to identify an attack on a network or endpoint device 210 (e.g., to exploit an operating system vulnerability, an application vulnerability, etc.), a rule and/or a pattern that can be applied to identify attacks or classes of attacks to endpoint device 210, reputation information that identifies a malicious resource (e.g., a malicious web site, a malicious network address, a malicious domain, a malicious endpoint device 210, etc.), or other criteria and/or conditions for identifying an intrusion and/or suspicious network traffic.

In some implementations, signature management device 280 may provide information that identifies a device configuration associated with the attack signature (e.g., a device configuration that is vulnerable to a type of attack capable of being detected by applying the attack signature to network traffic information). Additionally, or alternatively, intrusion detection device 240 may determine a device configuration associated with the attack signature. For example, intrusion detection device 240 may apply the attack signature to a portion of the network traffic information (e.g., a training set of the information). When intrusion detection device 240 detects intrusions, based on applying the attack signature, intrusion detection device 240 may determine if there are any patterns associated with the device configurations of endpoint devices 210 for which the intrusions were detected. If intrusion detection device 240 detects a pattern associated with a particular device configuration (e.g., a threshold quantity of intrusions detected for the particular device configuration), then intrusion detection device 240 may associate the particular device configuration with the attack signature. In this way, intrusion detection device 240 may learn which device configuration(s) are susceptible to an intrusion capable of being detected by applying a particular attack signature, and may apply the attack signature to endpoint devices 210 associated with the device configuration(s).

As further shown in FIG. 6, process 600 may include determining, based on configuration information, an endpoint device vulnerable to the intrusion and a time period during which the endpoint device was vulnerable to the intrusion (block 630). For example, intrusion detection system 230 (e.g., intrusion detection device 240), may determine, based on configuration information (e.g., stored by configuration management device 270), endpoint device(s) 210 vulnerable to the intrusion. Once intrusion detection device 240 has determined a device configuration vulnerable to an intrusion associated with an attack signature, intrusion detection device 240 may request and/or receive, from configuration management device 270, information that identifies endpoint devices 210 associated with the device configuration.

For example, intrusion detection device 240 may provide, to configuration management device 270, information that identifies a vulnerable device configuration. Configuration management device 270 may search a data structure to identify endpoint identifiers (e.g., persistent endpoint identifiers) that identify endpoint devices 210 that have and/or had the vulnerable device configuration. Configuration management device 270 may provide the endpoint identifiers to intrusion detection device 240.

Additionally, or alternatively, configuration management device 270 may determine, based on information stored in the data structure, a time period during which endpoint device 210, identified by an endpoint identifier, had the device configuration. Configuration management device 270 may provide information identifying the time period to intrusion detection device 240.

Additionally, or alternatively, configuration management device 270 may provide, to intrusion detection device 240, information that identifies a user, a group of users, a classification, etc., associated with endpoint device 210. Using this information, intrusion detection device 240 may determine whether an attack signature should be applied to endpoint device 210 based on, for example, the user, the group of users, the classification, etc., with which endpoint device 210 is associated. In this way, intrusion detection device 240 may selectively apply attack signatures to endpoint devices 210 that are identified as important (e.g., associated with a particular user, classification, etc.).

As further shown in FIG. 6, process 600 may include determining, based on mapping information, one or more temporary endpoint identifiers associated with the endpoint device during the time period (block 640). For example, intrusion detection system 230 (e.g., intrusion detection device 240), may determine, based on mapping information (e.g., stored by mapping device 260) one or more temporary endpoint identifiers that were assigned to endpoint device 210 during a time period that endpoint device 210 was vulnerable to an intrusion (e.g., during a time period that endpoint device 210 had a device configuration vulnerable to the intrusion).

As an example, intrusion detection device 240 may receive, from configuration management device 270, information that identifies a persistent endpoint identifier of endpoint device 210, and information that identifies a time period during which endpoint device 210 was vulnerable to the intrusion (e.g., when endpoint device 210 had a vulnerable device configuration). Intrusion detection device 240 may provide, to mapping device 260, information regarding the persistent endpoint identifier and the time period. Mapping device 260 may search a data structure, using the persistent endpoint identifier and information that identifies the time period, to identify one or more temporary endpoint identifiers (e.g., network addresses) assigned to endpoint device 210 during the time period. Mapping device 260 may provide the temporary endpoint identifiers to intrusion detection device 240.

As further shown in FIG. 6, process 600 may include applying the attack signature to historical network traffic information associated with the temporary endpoint identifier(s) and the time period (block 650), and determining whether the endpoint device was subjected to the intrusion based on applying the attack signature (block 660). For example, intrusion detection system 230 (e.g., intrusion detection device 240) may apply the attack signature to network traffic information associated with the temporary endpoint identifier(s) and the time period. In some implementations, intrusion detection device 240 may request, from traffic monitoring device 250, network traffic information associated with the temporary endpoint identifier(s) and the time period.

Traffic monitoring device 250 may search a data structure, using the temporary endpoint identifier(s) and the time period, to identify communications sent by and/or provided to endpoint device 210 that was assigned the temporary endpoint identifier(s) during the time period. Traffic monitoring device 250 may provide network traffic information, associated with the identified communications, to intrusion detection device 240. Intrusion detection device 240 may receive the network traffic information from traffic monitoring device 250, and may apply the attack signature to the received network traffic information.

Intrusion detection device 240 may apply an attack signature to the network traffic information by determining whether the network traffic information satisfies one or more conditions identified by the attack signature. If the conditions are satisfied, then intrusion detection device 240 may determine that endpoint device 210 (e.g., assigned the temporary endpoint identifier during the time period) was subjected to the intrusion. If the conditions are not satisfied, then intrusion detection device 240 may determine that endpoint device 210 was not subjected to the intrusion. In some implementations, intrusion detection device 240 may apply other attack signatures to the network traffic information because endpoint device 210 may have been vulnerable to other attacks during the time period (e.g., based on having a vulnerable device configuration).

In some implementations, intrusion detection device 240 may determine (e.g., based on stored configuration information) that a device configuration of endpoint device 210 includes a device configuration (e.g., a software configuration, a firmware configuration, etc.) that is known to trigger a false positive when the attack signature is applied. In this case, intrusion detection device 240 may prevent the attack signature from being applied to network traffic information associated with endpoint device 210.

By analyzing a subset of network traffic information associated with vulnerable endpoint devices 210 during vulnerable time periods, intrusion detection device 240 may operate more efficiently (e.g., by analyzing less network traffic) than if the attack signatures were applied to network traffic associated with all endpoint devices 210 during all time periods. Furthermore, by applying attack signatures to endpoint devices 210 known to be vulnerable to an intrusion, intrusion detection device 240 may reduce a quantity of false positive intrusions detected.

As further shown in FIG. 6, process 600 may include selectively performing an action, identified in response information, based on determining whether the endpoint device was subjected to the intrusion (block 670). For example, intrusion detection system 230 (e.g., intrusion detection device 240) may perform an action based on determining that endpoint device 210 was subjected to the intrusion. In some implementations, intrusion detection device 240 may determine an action to be performed by searching a data structure, using a persistent endpoint identifier associated with endpoint device 210, to identify the action (e.g., identified in stored response information).

As an example, the action may include sending a message about the detected intrusion to a system administrator (e.g., via an email message, a text message, etc.); providing a notification of the detected intrusion to another device (e.g., to a syslog server); logging information associated with the detected intrusion; blocking, restricting, analyzing, and/or diverting network traffic to and/or from endpoint device 210 associated with the intrusion; providing an instruction to block, restrict, analyze, and/or divert network traffic to and/or from endpoint device 210; or the like. In this way, when intrusion detection device 240 detects an intrusion, an action may be taken to notify a system administrator about the intrusion and/or to counteract the intrusion.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
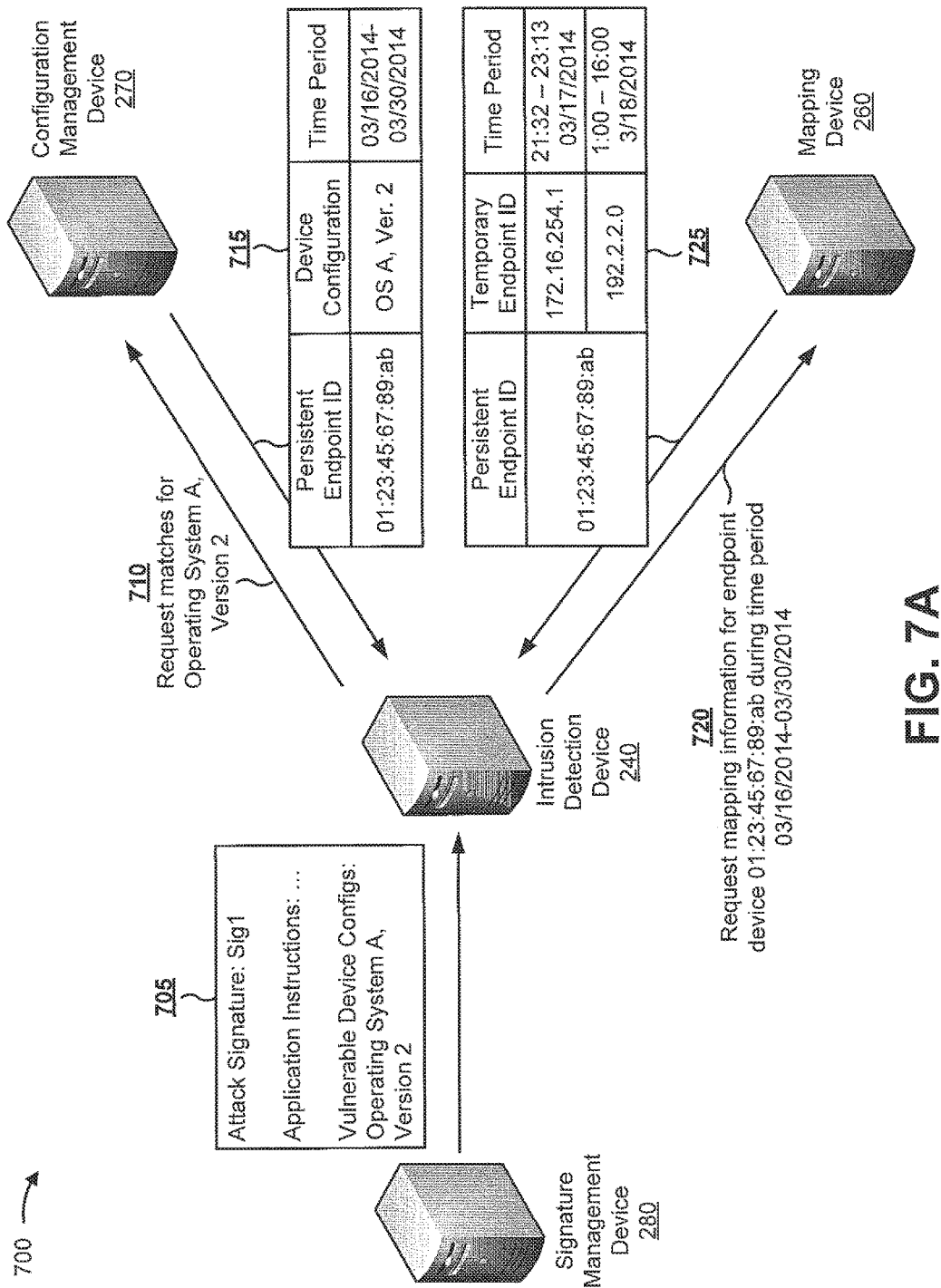
FIGS. 7A-7C are diagrams of an example implementation relating to the example process shown in FIG. 6.
Figure 7B:
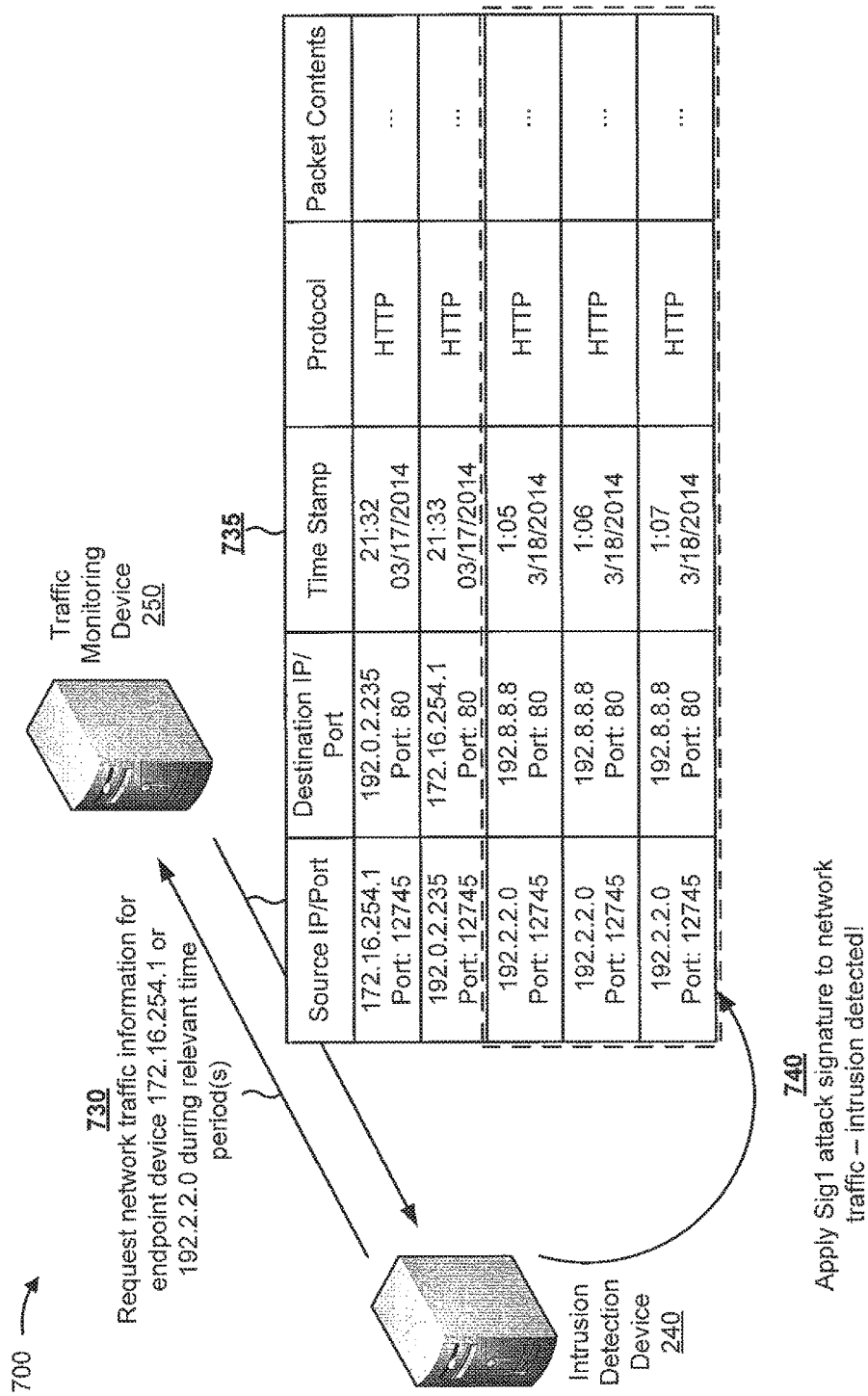
Figure 7C:
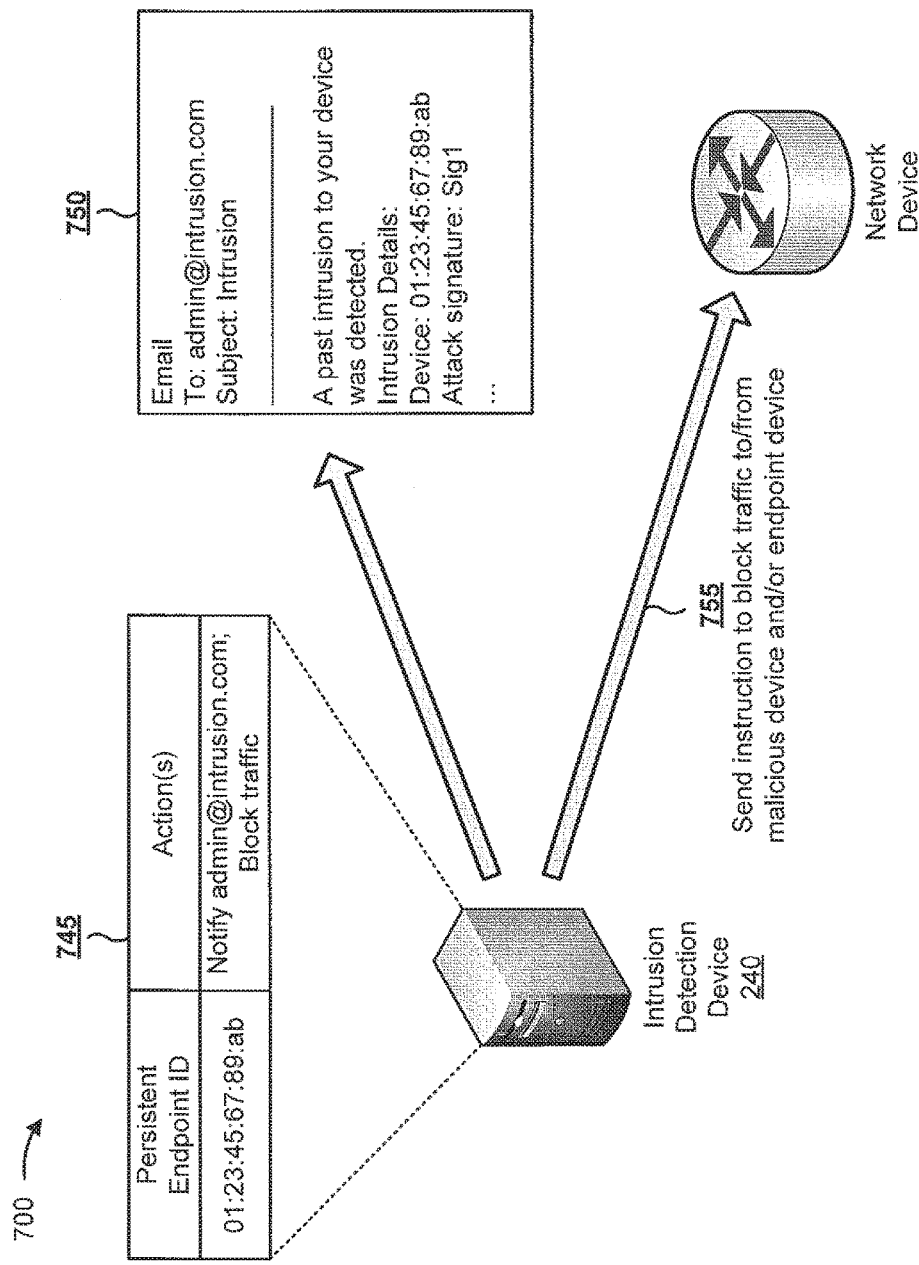

FIGS. 7A-7C are diagrams of an example implementation 700 relating to example process 600 shown in FIG. 6. FIGS. 7A-7C show an example of detecting a past intrusion based on historical network traffic information.

As shown in FIG. 7A, and by reference number 705, assume that signature management device 280 provides information identifying an attack signature and a vulnerable device configuration to intrusion detection device 240. As shown, the information identifies a name of the attack signature, shown as "Sig1," instructions on how the attack signature is to be applied (e.g., a set of conditions that, when met, indicate an intrusion), and a device configuration that is vulnerable to an intrusion capable of being detected by the attack signature, shown as "Operating System A, Version 2."

As shown by reference number 710, assume that intrusion detection device 240 requests, from configuration management device 270, information identifying endpoint devices 210 that have and/or had the device configuration of Operating System A, Version 2. As shown by reference number 715, assume that configuration management device 270 identifies and provides, to intrusion detection device 240, information regarding a persistent endpoint identifier, shown as "01:23:45:67:89:ab" of endpoint device 210 that had the requested device configuration, and information regarding a time period during which endpoint device 210 had the requested device configuration, shown as "Mar. 16, 2014- Mar. 30, 2014."

As shown by reference number 720, assume that intrusion detection device 240 uses the received information to send a request, to mapping device 260, for mapping information associated with endpoint device 210 identified by 01:23:45: 67:89:ab during the time period from Mar. 16, 2014 through Mar. 30, 2014. As shown by reference number 725, assume that mapping device 260 identifies and provides, to intrusion detection device 240, information regarding temporary endpoint identifiers assigned to endpoint device 210 identified by the persistent endpoint identifier of 01:23:45:67:89:ab, and corresponding time periods during which the temporary endpoint identifiers were assigned to endpoint device 210. As shown, assume that endpoint device 210 was assigned a first temporary endpoint identifier of "172.16.254.1" during a first time period from 21:32 to 23:13 on Mar. 17, 2014, and that endpoint device 210 was assigned a second temporary endpoint identifier of "192.2.2.0" during a second time period from 1:00 to 16:00 on Mar. 18, 2014.

As shown in FIG. 7B, and by reference number 730, assume that intrusion detection device 240 requests, from traffic monitoring device 250, network traffic information associated with the received temporary endpoint identifiers during the corresponding time periods. As shown by reference number 735, assume that traffic monitoring device 250 identifies and provides, to intrusion detection device 240, the requested network traffic information. Assume that the network traffic information includes information associated with packets transmitted and/or received by endpoint device 210 identified by the temporary endpoint identifiers during the corresponding time periods. For example, assume that the network traffic information identifies a source IP address, a source port, a destination IP address, a destination port, a time stamp, a protocol, and packet contents.

As shown by reference number 740, assume that intrusion detection device 240 applies the attack signature, Sig1, to the network traffic information. Based on applying the attack signature, assume that intrusion detection device 240 determines that endpoint device 210 was subjected to an intrusion. For example, assume that the attack signature indicates that endpoint device 210 has been subjected to an intrusion when endpoint device 210 sends repeated requests to a particular destination endpoint device 210, identified as 192.8.8.8. Assume that intrusion detection device 240 determines that endpoint device 210 sent the repeated requests to the particular destination endpoint device 210, and was thus subjected to an intrusion.

As shown in FIG. 7C, and by reference number 745, assume that intrusion detection device 240 searches a data structure, using the persistent endpoint identifier associated with endpoint device 210 subjected to the intrusion, to identify one or more actions to be taken when an intrusion is detected for endpoint device 210. For example, assume that the actions include sending an email message to a system administrator and sending an instruction to a network device to block traffic to and/or from endpoint device 210 (e.g., identified by 01:23:45:67:89:ab) and/or a malicious device associated with the intrusion (e.g., identified by 192.8.8.8). As shown by reference numbers 750 and 755, assume that intrusion detection device 240 performs the identified actions. For example, as shown by reference number 755, assume that intrusion detection device 240 provides an instruction, to a network device (e.g., a router, a gateway, a firewall, a switch, a wireless access point, etc.), to block traffic to and/or from the endpoint device 210 identified by the persistent endpoint identifier of 01:23:45: 67:89:ab and the malicious device identified by the network address of 192.8.8.8. In this way, intrusion detection device 240 may counteract the intrusion, and/or may send a message to a system administrator, who may then perform an action to counteract the intrusion.

As indicated above, FIGS. 7A-7C are provided merely as an example. Other examples are possible and may differ from what was described with regard to FIGS. 7A-7C.

Implementations described herein assist an intrusion detection system in detecting past intrusions and providing a notification of past intrusions. In this way, a system administrator may be alerted to a past intrusion or a current intrusion that took place before an attack signature, used to detect the intrusion, was generated.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a packet, a datagram, a frame, a fragment of a packet, a fragment of a datagram, a fragment of a frame, etc., or any other implementation for communicating information (e.g., at a particular communication layer).

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    identifying, by a device, an attack signature, for a new type of intrusion, that was generated after an occurrence of the new type of intrusion;
    receiving, by the device, information to apply the attack signature to network traffic;
    applying, by the device, the attack signature to the network traffic based on receiving information to apply the attack signature;
    detecting, by the device, an intrusion that occurred prior to the attack signature being generated based on applying the attack signature to the network traffic; and
    performing, by the device, an action based on detecting the intrusion.

2. The method of claim 1, further comprising:
    receiving the attack signature; and
    where applying the attack signature comprises:
        comparing a plurality of characteristics of the network traffic and the attack signature to detect the intrusion.

3. The method of claim 1, where receiving the information comprises:
    receiving information associated with a plurality of endpoint devices; and
    where applying the attack signature comprises:
        applying the attack signature to network traffic associated with the plurality of endpoint devices.

4. The method of claim 3, where the plurality of endpoint devices are associated with a plurality of temporary endpoint identifiers and a plurality of persistent endpoint identifiers,
    the plurality of temporary endpoint identifiers being mapped to the plurality of persistent endpoint identifiers.

5. The method of claim 3, further comprising:
    receiving information associated with the plurality of endpoint devices from at least one of:
        a traffic monitoring device;
        a mapping device; or
        a configuration management device.

6. The method of claim 1, where performing the action comprises at least one of:
    sending a message of the intrusion via an email message;
    providing a notification of the intrusion; or
    logging information associated with the intrusion.

7. A device, comprising:
    one or more processors to:
        determine an occurrence of a new type of intrusion;
        identify an attack signature, for the new type of intrusion, that was generated after the occurrence of the new type of intrusion;
        apply the attack signature to network traffic;
        detect an intrusion that occurred prior to the attack signature being generated based on applying the attack signature to the network traffic; and
        perform an action based on detecting the intrusion.

8. The device of claim 7, where the one or more processors, when performing the action, are to:
    block network traffic to an endpoint device associated with the intrusion;
    restrict network traffic to the endpoint device associated with the intrusion;
    analyze network traffic to the endpoint device associated with the intrusion; or
    divert network traffic to the endpoint device associated with the intrusion.

9. The device of claim 7, where the one or more processors are further to:
    receive information associated with a plurality of time periods,
        the plurality of time periods being associated with a communication,
        the plurality of time periods including:
            a time period at which the communication was transmitted by the device;
            a time period at which the communication was received by the device; or
            a time period at which the communication was processed by the device.

10. The device of claim 7, where the network traffic is monitored and stored by a traffic monitoring device.

11. The device of claim 7,
    where the one or more processors are further to:
        receive information associated with a plurality of endpoint devices; and
    where the one or more processors, when applying the attack signature, are to:
        apply the attack signature to network traffic associated with the plurality of endpoint devices.

12. The device of claim 11, where the plurality of endpoint devices are associated with a plurality of temporary endpoint identifiers and a plurality of persistent endpoint identifiers,
    the plurality of temporary endpoint identifiers being mapped to the plurality of persistent endpoint identifiers.

13. The device of claim 11, where the plurality of endpoint devices are associated a plurality of device configurations,
    the plurality of device configurations being stored by a configuration management device.

14. The device of claim 11, where the one or more processors, when receiving the information associated with the plurality of endpoint devices, are to:
    receive information associated with the plurality of endpoint devices from:
        a traffic monitoring device;
        a mapping device; and/or
        a configuration management device.

15. A non-transitory computer-readable medium storing instructions, the instructions comprising:
    one or more instructions that, when executed by one or more processors, cause the one or more processors to:
        identify an attack signature, for a new type of intrusion, that was generated after an occurrence of the new type of intrusion;
        apply the attack signature to network traffic;

detect an intrusion that occurred prior to the attack signature being generated based on applying the attack signature to the network traffic; and
perform an action based on detecting the intrusion.

16. The non-transitory computer-readable medium of claim 15, where the one or more instructions, when executed by the one or more processors, further cause the one or more processors to:
   receive the attack signature; and
   where the one or more processors, when applying the attack signature, are to:
      compare a plurality of characteristics of the network traffic and the attack signature to detect the intrusion.

17. The non-transitory computer-readable medium of claim 15, where the one or more instructions, that cause the one or more processors to perform the action, further cause the one or more processors to:
   send a message of the intrusion;
   provide a notification of the intrusion; and/or
   log information associated with the intrusion.

18. The non-transitory computer-readable medium of claim 15, where the one or more instructions, that cause the one or more processors to perform the action, further cause the one or more processors to:
   block network traffic to or from an endpoint device associated with the intrusion;
   restrict network traffic to or from the endpoint device associated with the intrusion;
   analyze network traffic to or from the endpoint device associated with the intrusion; or
   divert network traffic to or from the endpoint device associated with the intrusion.

19. The non-transitory computer-readable medium of claim 15, where the one or more instructions, when executed by the one or more processors, further cause the one or more processors to:
   receive information associated with a plurality of time periods,
      the plurality of time periods being associated with a communication,
      the plurality of time periods including:
         a time period at which the communication was transmitted by a device;
         a time period at which the communication was received by the device; or
         a time period at which the communication was processed by the device.

20. The non-transitory computer-readable medium of claim 15, where the network traffic is monitored and stored by a traffic monitoring device.

* * * * *